United States Patent [19]

Bier et al.

[11] 4,223,113

[45] Sep. 16, 1980

[54] POLYESTER COMPOSITIONS WHICH CRYSTALLIZE RAPIDLY

[75] Inventors: Peter Bier, New Martinsville, W. Va.; Rudolf Binsack, Krefeld, Fed. Rep. of Germany

[73] Assignee: Bayer Aktiengesellschaft, Leverkusen, Fed. Rep. of Germany

[21] Appl. No.: 40,387

[22] Filed: May 18, 1979

Related U.S. Application Data

[63] Continuation-in-part of Ser. No. 875,015, Feb. 3, 1978, abandoned, and a continuation-in-part of Ser. No. 960,976, Nov. 15, 1978, abandoned, which is a continuation of Ser. No. 852,894, Nov. 18, 1977, abandoned.

[30] Foreign Application Priority Data

Nov. 23, 1976 [DE] Fed. Rep. of Germany ....... 2653120
Feb. 14, 1977 [DE] Fed. Rep. of Germany ....... 2706128

[51] Int. Cl.² .............................................. C08G 63/76
[52] U.S. Cl. ...................................... 525/439; 525/444
[58] Field of Search ................................ 525/439, 444

[56] References Cited

U.S. PATENT DOCUMENTS

| | | | |
|---|---|---|---|
| 3,134,744 | 5/1964 | Starck et al. | |
| 3,368,995 | 2/1968 | Furukawa et al. | 260/40 R |
| 3,372,148 | 3/1968 | Wiener | |
| 3,516,957 | 6/1970 | Gray et al. | 260/22 R |
| 3,565,852 | 2/1971 | Conix et al. | 260/40 R |
| 3,576,774 | 4/1971 | Myers et al. | 260/22 R |
| 3,644,267 | 2/1972 | Jackson et al. | 260/33.6 R |
| 3,673,139 | 6/1972 | Hrach | 528/305 X |
| 3,692,744 | 9/1972 | Rich et al. | 528/296 |
| 3,707,578 | 12/1972 | Vasta | 528/309 X |
| 3,835,089 | 9/1974 | Fox et al. | |
| 3,843,615 | 10/1974 | Herwig et al. | 525/444 |
| 3,892,821 | 7/1975 | Koleske et al. | 525/411 |
| 3,907,926 | 9/1975 | Brown et al. | |
| 3,966,671 | 6/1976 | Smith | |
| 4,049,611 | 9/1977 | Hirzy | 260/31.6 |
| 4,097,421 | 6/1978 | Chang | 260/40 R |
| 4,125,572 | 11/1978 | Scott | |
| 4,135,009 | 1/1979 | Mercurio | 427/195 |

FOREIGN PATENT DOCUMENTS

| | | |
|---|---|---|
| 2042447 | 4/1971 | Fed. Rep. of Germany. |
| 1104089 | 2/1968 | United Kingdom. |
| 1111012 | 4/1968 | United Kingdom. |
| 1224684 | 3/1971 | United Kingdom. |
| 1228966 | 4/1971 | United Kingdom. |
| 1285828 | 4/1972 | United Kingdom. |
| 1340761 | 12/1973 | United Kingdom. |
| 2015013 | 9/1979 | United Kingdom. |
| 2015014 | 9/1979 | United Kingdom. |

*Primary Examiner*—Lucille M. Phynes
*Attorney, Agent, or Firm*—Gene Harsh; Lawrence S. Pope

[57] ABSTRACT

Polyalkylene terephthalates containing 0.5–30% by weight of oligomeric carboxylic acid polyesters have a higher crystallization speed and thus allow lower mold temperatures and shorter injection cycles. The polyalkylene terephthalates generally have intrinsic viscosities in excess of about 0.4 dl/g in 1:1 phenol tetrachloroethane at 25° C. and are at least about 90 mol % terephthalic acid based. The oligomer additive is based on carboxylic acids, with sebacic and adipic being preferred, and aliphatic, cycloaliphatic or araliphatic dihydric alcohols. This additive has a minimum polymerization degree of 2 and a maximum number-average molecular weight of about 6000.

Faster crystallization rates can be imparted to polyalkylene terephthalates by mixing them with the ester additive and melt homogenizing the mixture.

19 Claims, No Drawings

POLYESTER COMPOSITIONS WHICH CRYSTALLIZE RAPIDLY

This application is a continuation-in-part of our co-pending applications Ser. No. 960,976 filed Nov. 15, 1978 abandoned and Ser. No. 875,015 filed Feb. 3, 1978 abandoned. Ser. No. 960,976 is in turn a continuation of application Ser. No. 852,894 filed Nov. 18, 1977 and now abandoned.

FIELD OF THE INVENTION

This invention relates to highly crystalline, rapidly crystallizing thermoplastic compound comprising a high molecular weight polyalkylene terephthalate and an oligomeric polyester which causes the high molecular weight polyester to crystallize more rapidly.

BACKGROUND OF THE INVENTION

Polyalkylene terephthalates are used for manufacturing fibers, films and molded articles. They have excellent physical properties such as high wear resistance, durability, and high dimensional accuracy due to their partly crystalline structure and they are, therefore, particularly suitable for the manufacture of heavy duty molded articles. The mechanical properties can be further improved by incorporating reinforcing materials such as glass fibers (British Pat. No. 1,111,012, U.S. Pat. No. 3,368,995 and German Auslegeschrift No. 2,042,447).

Polyethylene terephthalate (PET) is particularly suitable for the manufacture of fibers, filaments, and sheets, but it is hardly suitable for injection molding because of high molding temperatures (approximately 140° C.) and relatively long molding times required. These stringent processing conditions prevent the use of polyethylene terephthalate for injection molding in spite of its high rigidity and heat distortion temperature. In particular, the high mold temperature required is beyond the equipment capabilities of many mold shops which have only water heated molds. Such molds are normally capable of temperatures no higher than about 110° C. Thus, wider use of this polymer is restricted not only by the economics of its long processing cycle but also by the inability of many potential end users to process the resin at all.

Although polypropylene terephthalate (PPT) and polybutylene terephthalate (PBT) require shorter molding times and lower molding temperatures (approximately 80° C.) owing to their higher rate of crystallization, they are inferior to polyethylene terephthalate in their physical properties, particularly in their heat distortion temperature.

High crystallinity ensures hardness, dimensional stability and resistance to distortion even at elevated temperatures. For optimum properties high crystallinity must be arrived at as rapidly as possible. Thus in polyethylene terephthalate crystallization can be improved and accelerated by nucleation with finely divided inorganic solids (Netherlands Patent Application No. 65.11744). Generally the maximum degree of crystallinity obtainable for PET gives an energy of crystallization of about 14 cal/g and satisfactory mechanical properties are usually obtained when the crystallization energy is in excess of about 6 cal/g. The injection molding cycle time which governs the economics of the process depends on the time interval for which the cast must stay in the mold. To obtain a satisfactory degree of crystallization these cycles must be uneconomically long even at high molding temperatures and, therefore, prevent the wide use of polyethylene terephthalate in the manufacture of injection molded articles.

An object of the present invention is the provision of polyalkylene terephthalates compositions which have a higher crystallization velocity and higher crystallinity than those already known. A further object of the invention are polyalkylene terephthalates compositions which can be molded more rapidly and at lower temperatures than has been possible heretofor. An especial object is the provision of polyethylene terephthalates compositions (PET) which can be molded at temperatures below about 120° C. and still retain a high degree of crystallinity.

In such polyester compositions the degree of crystallinity required for high dimensional stability is achieved more rapidly so that the injection molding cycles are substantially shortened. Also, the molding temperature can be lower without impairing the crystallization behavior. The injection molded casts, therefore, cool more rapidly, and the residence time in the mold is, therefore, also reduced.

In addition, it has long been an earnest desire of the manufacturers of polyesters also to produce other polyalkylene terephthalates with a higher rate of crystallization and higher crystallinity.

SUMMARY OF THE INVENTION

It has now been found, surprisingly, that polyalkylene terephthalate compositions crystallize more rapidly when they contain about 0.5–30% by weight, relative to the polyalkylene terephthalate, of oligomeric polyester.

The invention relates to thermoplastic compositions which crystallize rapidly comprising a. about 70–99.5, preferably about 85–99.5, most preferably about 88–96% by weight of a high molecular polyalkylene terephthalate which has an intrinsic viscosity of at least about 0.4 dl/g and preferably of at least about 0.8 dl/g (measured as a 0.5% strength by weight solution in a phenol/tetrachloroethane mixture in a weight ratio of 1:1 at 25° C.) and b. about 0.5–30, preferably about 0.5–15, and most preferably about 4–12% by weight of an oligomeric polyester with a polymerization degree of at least 2 and a maximum number-average molecular weight of about 6000. Preferably these polyesters are synthesized from carboxylic acids having between 1 and 20 carbon atoms and dihydric alcohols having between 2 and 20 carbon atoms. The acids may be aliphatic, aromatic or cycloaliphatic and the alcohols may be aliphatic or cycloaliphatic. Either rest may carry substituents which are substantially inert to high molecular weight polyalkylene terephthalate under normal injection molding conditions.

The present invention also provides a process for the production of rapidly crystallizing thermoplastic compounds, wherein from about 70 to 99.5% by weight, preferably from about 85 to 99.5% by weight, and most preferably about 88 to 96% by weight of a high molecular weight polyalkylene terephthalate having an intrinsic viscosity of at least 0.4 dl/g, preferably at least about 0.8 dl/g (determined on an 0.5% by weight solution in a mixture of phenol and tetrachloroethane in proportions by weight of 1:1 at 25° C.) and from about 0.5 to 30% by weight, preferably from about 0.5 to 15% by weight, and most preferably about 4 to 12% by weight of said oligomeric polyester are mixed together and homogenized in the melt. The operation can be carried out in a mixing screw extruder, for example; the solidified melt can, subsequently, be granulated.

The present invention also provides a method of injection molding polyethylene terephthalate at mold temperatures of about 120° C. or less to produce highly crystalline articles, preferably articles in which the molded composition has an energy of crystallization of about 6 cal/g or greater by incorporating between about 0.5 and 30, preferably 0.5 and 15, most preferably 4 and 12 wt. % of an oligomeric polyester into said polymer.

DETAILED DESCRIPTION OF THE INVENTION

The dicarboxylic acid component of the polyalkylene terephthalate (a) consists of terephthalic acid which may contain up to 10 mol %, based on the acid component of other aromatic dicarboxylic acids having from 6 to 14 C-atoms, of aliphatic dicarboxylic acids having from 4 to 8 C-atoms or of cycloaliphatic dicarboxylic acids having from 8 to 12 C-atoms. Examples of such dicarboxylic acids to be included with terephthalic acid are phthalic acid, isophthalic acid, naphthalene-2,6-dicarboxylic acid, diphenyl-4,4'-dicarboxylic acid, adipic acid, sebacic acid and cyclohexanediacetic acid.

The preferred diol component of the polyalkylene terephthalate is a diol from 1 to 12 carbon atoms for example, propane-1,3-diol, butane-1,4-diol, pentane-1,5-diol, hexane-1,6-diol or cyclohexane-1,4-dimethanol and, preferably ethylene glycol; it may contain up to 10 mol % of other aliphatic diols having from 3 to 8 C-atoms, cycloaliphatic diols having from 6 to 15 C-atoms or aromatic diols having from 6 to 21 C-atoms. Examples of such additional diols ("Codiols") include 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-($\beta$-hydroxyethoxy)-benzene, 2,2-bis-(4-hydroxycyclohexyl)-propane, 2,4-dihydroxy-1,1,3,3-tetramethyl-cyclobutane, 2,2-bis-(3-$\beta$-hydroxyethoxyphenyl)-propane and 2,2-bis-(4-hydroxypropoxyphenyl)-propane.

The polyalkylene terephthalates (1) can be branched by incorporating trihydric or tetrahydric alcohols or tribasic or tetrabasic acids, as described in German Offenlegungsschrift No. 1,900,270 and in U.S. Pat. No. 3,692,744. Examples of suitable branching agents include trimesic acid, pyromellitic acid, trimethylolpropane and ethane, and pentaerythritol. It is advisable not to use more than 1 mole % of branching agent, based on the quantity of acid component.

Polyalkylene terephthalates derived mainly from terephthalic acid and ethylene glycol are preferred and homoethylene terephthalate, i.e. a product produced substantially only from ethylene glycol and terephthalate acid or its esters, or its anhydride is most preferred.

The polyalkylene terephthalate can be prepared in known manner by (a) esterification or transesterification of terephthalic acid and/or of the corresponding dialkylterephthalates, preferably the dimethyl ester, with from 1.05 to 5.0 mol, preferably from 1.4 to 3.6 mol of the diol, based on 1 mol of the dicarboxylic acid component, and optionally the branching agent, in the presence of esterification and/or transesterification catalysts (first stage), and (b) polycondensation of the resulting reaction products in the presence of polycondensation catalysts at temperatures between 200° and 320° C. at reduced pressure (preferably below 1 Torr) (second stage).

Both the first step (a) and the second step (b) of condensation are usually carried out in the presence of catalysts, e.g., those described by R. E. Wilfong in J. Polym. Sci. 54, 385 (1961). Some of these catalysts (A) are more powerful accelerators of the esterification reaction, (a) others (B) for the polycondensation reaction (b) still others (C) are fairly active for both (a) and (b).

The following are examples: catalysts (A) which are suitable for accelerating reaction (a):

1. Lithium sodium, potassium, calcium, strontium and boron in the form of the metals or their oxides, hydrides, formates, acetates, alcoholates or glycollates;
2. calcium and strontium chlorides and bromides;
3. tertiary amines;
4. calcium and strontium malonates, adipates, benzoates, etc.,
5. lithium salts of dithiocarbamic acids.

The following are examples of catalysts (B) suitable for the polycondensation reaction (b):

1. Molybdenum, germanium, lead, tin, and antimony in the form of the metals or their oxides, hydrides, formates, alcoholates or glycollates;
2. zinc and lead perborates and borates;
3. zinc, manganese (II), cobalt, magnesium, chromium, iron and cadmium succinates, butyrates, adipates or enolates of a diketone;
4. zinc chloride and bromide;
5. lanthanum dioxide and titanate;
6. neodymium chloride;
7. mixed salts of antimony, e.g. potassium antimony tartrate, and salts of antimonic acids, such as potassium pyroantimonate;
8. zinc or manganese salts of dithiocarbamic acids;
9. cobalt naphthonate;
10. titanium tetrafluoride or tetrachloride;
11. alkyl ortho-titanates;
12. titanium tetrachloride ether complexes;
13. quaternary ammonium salts carrying a titanium hexaalkoxy group; titanium tetraalkoxides, alkali metal or alkaline earth metal compounds of aluminum, zirconium or titanium alkoxides;
14. organic quaternary ammonium, sulphonium, phosphonium and oxonium hydroxides and salts;
15. barium malonate, adipate, benzoate, etc.;
16. lead, zinc, cadmium or manganese salts of the monoalkyl ester of a phenylene dicarboxylic acid;
17. antimony catechuic complexes with an amino alcohol or with an amine and an alcohol;
18. uranium trioxide, tetrahalide, nitrate, sulphate or acetate.

The following are examples of catalysts (C) which are suitable for accelerating both steps (a) & (b) of the reaction;

1. Barium, magnesium, zinc, cadmium, aluminum, manganese and cobalt as the metals or their oxides, hydrides, formates, alcoholates, glycolates or, preferably as acetates;
2. aluminum chloride and bromide;
3. zinc, manganese (II), cobalt, magnesium, chromium, iron and cadmium succinates, butyrates, adipates or enolates of a diketone.

The most suitable compounds for use as catalysts (A) are calcium, zinc and manganese salts, particularly the acetates.

The most suitable catalysts (B) are the compounds of zinc, manganese, cobalt, antimony, germanium, titanium and tin, e.g. zinc and manganese acetate, antimony trioxide, trichloride and triacetate, and germanium dioxide and tetrachloride.

The most suitable catalysts (C) are particularly the titanium compounds, e.g. tetraalkyltitanium acid esters having alkyl groups with from 1 to 10 C-atoms, such as tetraisopropyltitanate and tetrabutyltitanate.

The catalysts are used in quantities of from 0.001 to 0.2% by weight, based on the dicarboxylic acid components.

Inhibitors may be added in the process to inhibit the catalysts (A) after completion of the first reaction step (a) and to increase the stability of the end product, (cf. "Polyesterfasern" by H. Ludewig, 2nd Edition, Publishers Akademie-Verlag, Berlin 1974). The following are examples of such inhibitors: phosphoric acid, phosphorous acid and aliphatic, aromatic and araliphatic esters thereof, e.g. the alkyl esters having from 6 to 18 C-atoms in the alcohol component, phenyl esters in which the phenyl groups can carry 1 to 3 substituents having 6 to 18 C-atoms, such as trinonylphenyl phosphate, dodecyl phenyl phosphate or triphenyl phosphate. These inhibitors are usually added in quantities of from 0.01 to 0.6% by weight, based on the dicarboxylic acid component.

In order to obtain an even higher molecular weight, the polyalkylene terephthalates may be subjected to a solid phase polycondensation. This is generally carried out by subjecting the granulated product to a temperature which is from 60° to 6° C. below the melting point of the polymer, either in a stream of nitrogen or under a vacuum of less than 1 Torr.

The compounds to be employed as the oligomeric polyester b. may consist essentially of structural units of the formulae I or II

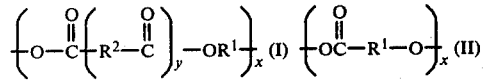

or mixtures thereof
wherein
  $R^1$ denotes a linear or branched aliphatic, cycloaliphatic or araliphatic divalent radical with 2–20 C-atoms, preferably 2 to 10 C-atoms,
  $R^2$ denotes a linear or branched aliphatic, cycloaliphatic, araliphatic or aromatic divalent radical of 2 to 20, preferably 3 to 10, C-atoms,
and
  x denotes an integer of at least 2, up to any value giving the oligomer a number-average molecular weight of 6000 or less,
  y is an integer of 0 or 1, in the former case the oligomer is an aliphatic polycarbonate which is a special type of polyester.

Of course, mixtures of different compounds which fall under the above formula can also be employed.

The oligomeric polyester b. can be prepared by esterification or transesterification of dicarboxylic acids, their anhydrides and/or the corresponding dialkyl derivatives with aliphatic, cycloaliphatic or araliphatic alcohols.

A detailed description of the various methods of preparation is given by H. Henecka et al in Houben-Weyl, Vol. VIII, page 359–680, (1952); by E. Müller in Houben-Weyl 14/2, (1963), 1 et seq.; Georg Thieme Verlag, Stuttgart 1963; and in V. V. Korshak and S. V. Vinogradova, "Polyesters", Pergamon Press, Oxford 1965, particularly pages 34–63.

Suitable oligomeric polyesters can also be prepared by the polymerization of cyclic esters in the manner disclosed in U.S. Pat. Nos. 2,914,556; 2,977,385 and 3,892,821, all incorporated herein by reference.

Preferred oligomeric polyesters b. are those which are derived from the following acids and alcohols which include some mono- and tricarboxylic acids as well as some more than difunctional alcohols. These are used in such proportions as will yield a primarily uncrosslinked structure in accordance with the hereinabove formulae (I and II). However, suitable oligomers include those branched or terminated by more or less than difunctional reactants, respectively, of the following list.

1. Di- and Tricarboxylic Acids
   adipic acid, azelaic acid,
   citric acid C(OH) (COOH) (CH$_2$COOH)$_2$
   fumaric, maleic acid HOOCHC=CHCOOH
   glutaric acid, phthalic, isophthalic, terephthalic acid,
   trimellitic acid, trimesitinic acid, succinic acid,
   tartaric acid HOOC(CHOH)$_2$COOH
   sabacic acid 2. Monocarboxylic Acids
   cresotic acid, salicylic acid, acetic acid, iso-butyric acid, caproic acid, caprylic acid, pelargonic acid,
   2-ethylhexanoic acid, lauric acid, myristic acid,
   palmitic acid, stearic acid,
   oleic acid CH$_3$(CH$_2$)$_7$ CH=CH(CH$_2$)$_7$COOH
   ricinolic acid CH$_3$(CH$_2$)$_5$ CH(OH)CH$_2$CH=CH(CH)$_7$COOH
   2-ethylbutyric acid, behenic acid, benzoic acid,
   abictic acid, 2-phenylbutyric acid, tall oil, fatty acid 3. Di and Higher Functional Alcohols
   ethyleneglycol
   propanediol 1,3/1,2
   butanediol 1,3/1,4
   pentanediol 1,5
   hexanediol 1,6
   dipropyleneglycol 1,3/1,2
   diethyleneglycol
   triethyleneglycol
   tetraethyleneglycol
   polyethylene glycol $\overline{M}_n$-400
   neopentylglycol HO—CH$_2$—C(CH$_3$)$_2$—CH$_2$OH
   glycerol HOCH$_2$—CHOH—CH$_2$OH
   trimethylolethane CH$_3$C(CH$_2$OH)$_3$
   trimethylolpropane C$_2$H$_5$C(CH$_2$OH)$_3$
   pentaerythritol C(CH$_2$OH)$_4$
   2,2,4 trimethyl-1,3-pentanediol
   sucrose 4. Monofunctional Alcohols
   2-ethylhexanol, isonol, tertiary butanol
   methanol, isopropanol

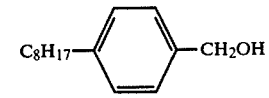

octylbenzylalcohol
   butylalcohol, iso-butylalcohol 2-ethylhexanol
   iso-nonylalcohol
   n-octylalcohol, iso-octylalcohol n-decylalcohol, iso-decylalcohol
butoxyethylalcohol CH$_3$(CH$_2$)$_3$—O(CH$_2$)$_2$OH
butoxyethyloxyethylalcohol CH$_3$(CH$_2$)$_3$—O(CH$_2$)$_2$O(CH$_2$)$_2$OH
cyclohexylalcohol

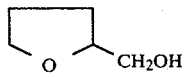

n-hexylalcohol
tetrahydrofurfurylalcohol
2-butoxyethylalcohol CH$_3$—CH—(OCH$_2$CH$_2$OH)—CH$_2$CH$_3$
ethylalcohol
amylalcohol
n-undecylacohol
tridecylalcohol
butylbenzylalcohol
methylcyclohexylalcohol
methoxyethylalcohol
benzylalcohol
allylalcohol CH$_2$=CH—CH$_2$OH
hydroabietylalcohol Especially preferred oligomers are those using adipic acid or sebacic acid as the dicarboxylic acid, 2-ethylhexane-1,3-diol, 2,2,4-trimethylpentane-1,3-diol, butane-1,3-diol, hexane-1,6-diol or butane-1,4-diol as the diol component and 2-ethylhexanol, 3,5,5-trimethylhexanol or n-butanol as the monohydric alcohol component.

Particularly suitable oligomers are poly-(butane-1,3-diol adipate), poly-(hexane-1,6-diol adipate), and poly-(butane-1,4-diol adipate).

Also preferred are those oligomers which are terminated by branched aliphatic, cycloaliphatic or araliphatic groups, especially aliphatic groups having 3 to 12 C-atoms. However, as is evident from the preferred acids and alcohols suitable oligomers may be synthesized from components which contain after incorporation into the oligomer:

(a) residual OH groups, e.g., citric acid, tartaric acid, sucrose, cresotic acid, salicylic acid;
(b) double bonds, e.g., fumaric acid, maleic acid, oleic acid, ricinoleic acid, allylalcohol;
(c) phenyl groups, e.g., 2-phenylbutyric acid, octylbenzylalcohol, butylbenzyl alcohol, benzylalcohol;
(d) ether bonds, e.g., diethyleneglycol, dipropyleneglycol, polyethyleneglycol, tetrahydrofurfurylalcohol, butoxyethylalcohol, etc.
(e) thioetherbonds, e.g., 2 hydroxyethyl sulfide, thiodiacetic acid, thiodipropanol, thiodipropionic acid;
(f) cyclohexyl groups, e.g., cyclohexanol cyclohexanediol, cyclohexanedimethylol, cyclohexanoic acid; and
(g) halogen atoms, e.g., chloromaleic acid, tetrachlorophthalic acid, tetrachloro terephthalic acid, α-bromoisobutyric acid, 2-bromopalmitic acid, 3-bromo-2-propanol, 3-chloropropionic acid, 3-chlorobenzylalcohol.

Of course, suitable oligomers can also be prepared from aliphatic hydroxy bearing carboxylic acids such as ricinolic acid which are self-polymerizable under suitable conditions.

Suitable substituents to the oligomer chain should be "substantially unreactive" with the high molecular weight polyalkylene terephthalate under injection molding conditions in the sense that under such conditions any chemical interaction which may occur does not have a significant effect upon the macroscopic properties of the high molecular weight polyester. For instance, substituents which would cause cleavage of the linkage,

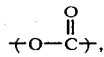

of the high polymer to the extent that its mechanical properties were significantly reduced would be excluded. Also excluded are those substituents which would cause significant crosslinking of the high polymer, e.g., epoxy groups if more than one were present per molecule of the oligomer.

Injection molding conditions for polyalkylene terephthalates are well known to those skilled in the art and are taught in U.S. Pat. No. 3,516,957, incorporated herein by reference, and *Injection Molding Theory and Practice*, by Ervin I. Rubin, published by Wiley Interscience, 1972. Generally, these conditions involve temperatures of between about 250° and 310° C., residence times at elevated temperatures of about 1 to 15 minutes, pressures of up to about 20,000 psi and shear rates of between about 100 and 10,000 reciprocal seconds. These conditions may also include vacuums of down to 20 inches of Hg. Of course, these conditions also include mold temperatures of between about 100° and 200° C. but at these lower temperatures interaction between the high molecular weight polyalkylene terephthalate and substituents of the oligomeric polyester are less probable than at the higher injection temperatures. Naturally, suitable substituents need not be "substantially unreactive" at the extreme of such conditions but only for a reasonable portion of the normally encountered range.

The compositions of the present invention find primary utility in injection molding and therefore exclude any oligomeric polyesters which under such conditions would interact with the high molecular weight polyester to the extent of significantly degrading the polymer's mechanical properties. Of course, the tendency of a given oligomer to cause such results would depend not only upon its inherent chemical activity but also upon its concentration in the composition. Its concentration in the composition would in turn depend upon its effectiveness in promoting more rapid crystallization of the polyester. Therefore a given oligomer might be suitable in the compositions of the present invention because at the concentration required for effective acceleration of the crystallization of the high molecular weight polymer it has no significant detrimental effect on the polymer's mechanical properties although at higher concentrations it would have detrimental effects.

Those oligomers which have low volatility under injection molding conditions are especially preferred. Those oligomers having number-average molecular weights in excess of 600 are preferred for this reason. On the other hand, the oligomer's effectiveness in promoting crystallization decreases somewhat with increasing molecular weight and therefore number-average molecular weights under about 3000 are preferred.

Without limiting the generality of the foregoing or being bound to any particular theory of operation the Applicants believe the oligomers of the present invention function in a unique manner to facilitate the molecular chain alignment necessary for the crystallization of the high molecular weight polyalkylene terephthalate. These oligomers by virtue of their ester bonds are fairly compatible with the high molecular weight polyester and achieve a fairly good distribution therein. But their structure is sufficiently different from that of the high molecular weight polymer to provide an enhanced mobility to the molecular chains of the polymer phase thus lowering the free energy required for the creation of crystalline domains as compared to an unmodified polymer.

It is believed that in order to most effectively function in this manner that the oligomers should meet the following two criteria:

(1) They should be sufficiently compatible with the high molecular weight polymer matrix to remain substantially uniformly distributed during customary thermoplastic processing, such as extrusion and injection molding; and (2) they should significantly improve the speed and ease with which the high molecular weight polymer molecules can form themselves into a crystalline array.

Those oligomers which meet both these criteria are preferred. These criteria may be simultaneously met by selecting oligomers which have a sufficient ester bond content to be compatible with the polyester matrix and yet a high enough carbon atom content to effect a significant increase in molecular mobility. Those oligomers with carbon atom to ester bond ratios of no less than about 4, preferably 5, and most preferably 10 and no greater than about 15, preferably about 14 inclusive of the carbonyl carbon atom are believed to meet these criteria and are for that reason preferred.

The preparation of the polyester compositions according to the invention, which crystallize rapidly, from a polyalkylene terephthalate a. and an oligomeric polyester b. can be carried out in commercially available mixing equipment. Examples of suitable equipment are kneaders, single screw extruders and twin screw extruders. For further processing, the resulting mixture can be granulated after the melt has solidified. In this case also, a solid phase post-condensation reaction can follow.

The compositions of the present invention which include polyalkylene terephthalates based primarily upon ethylene glycol and terephthalic acid may be molded at temperatures of below about 120° C. and still develop sufficient crystallinity to display the superior mechanical and chemical properties which makes these resins attractive for injection molded articles. Such polymers typically display maximum heats of crystallization of no more than about 14 cal/g under optimum conditions (high mold temperatures, e.g. above about 140° C., and long residence time in the mold, e.g. in excess of one minute). When used in compositions of the present invention these polymers may be molded under much less favorable conditions (colder molds, e.g. below about 120° C., and shorter residence time in the mold, e.g. less than about 60 seconds) and still display heats of crystallization in excess of about 70% of those obtainable under optimum conditions, e.g. in excess of about 6 cal/g; thus, the present invention includes a process for molding resins based primarily, and preferably solely, upon terephthalic acid and ethylene glycol at mold temperatures of less than about 120° C. while retaining significant crystallinity, preferably more than about 70% of the maximum crystallinity obtainable under optimum injection molding conditions with the polyester alone.

The process comprises intimately blending the terephthalic acid/ethylene glycol based resin and oligomeric polyesters and injection molding the composition so prepared into molds held at temperatures less than about 120° C., preferably less than about 110° C. The polyester preferably consists of acid residues of which at least 90 mol % are derived from terephthalic acid and of alcohol residues of which at least 90 mol % are derived from ethylene glycol and most preferably is a homopolyethylene terephthalate. The other components of the polyester may be any of those discussed hereinabove as being suitable. This polyester should have a minimum intrinsic viscosity of about 0.4 dl/g, preferably 0.8 dl/g (measured as a 0.5% strength by weight solution in a phenol/tetrachloroethane mixture in a weight ratio of 1:1 at 25° C.). The oligomeric polyester may be any of those discussed hereinabove as being suitable for enhancing the crystallization of polyalkylene terephthalates. Sufficient oligomer should be used to permit the retention of a significant degree of crystallization by the polyester when injection molded into molds colder than about 120° C. Preferably no less than about 0.5 wt. %, more preferably no less than about 4 wt. % of this ester and no more than about 30 wt. %, more preferably 15 wt. %, most preferably 12 wt. %, is used based on the weight of polyester and ester.

In a preferred embodiment of this process aspect of the present invention the residence time in the mold is significantly less than that required for the unmodified polyester (e.g. pure resin) in making the same part. For small fairly simple parts this may be less than about 30 seconds, more preferably less than about 20 seconds and most preferably less than 10 seconds as compared to 40 seconds or more for unmodified resin. Adequate crystallinity can be assured under such conditions by using an amount of oligomer sufficient to impart at least 70% of the crystallinity achievable by the pure resin at mold temperatures above about 140° C. and residence times in excess of about 60 seconds. It is particularly desirable to use sufficient oligomer to impart a heat of crystallization to the molded resin in excess of about 6 cal/g. Of course, significant reductions in the mold residence time of resins modified with conventional additives such as microtalc nucleating agent or glass fiber reinforcing agent are also obtained by further modifying these resins with appropriate amounts of the oligomeric polyesters of the present invention.

The usual quantities of stabilizers, preferably from 0.01 to 0.5% by wt., based on the weight of the polyalkylene terephthalates (exclusive fillers or reinforcements) can be added to protect against thermooxidative degradation. Suitable stabilizers include phenols and phenol derivatives, particularly sterically hindered phenols which have alkyl substituents with 1 to 6 C-atoms in both ortho-positions to the phenolic hydroxyl group, amines, preferably secondary arylamines and their derivatives, phosphates and phosphites, preferably their aryl derivatives, quinones, copper salts of organic acids, addition compounds of copper (1) halides with phosphites, e.g. 4,4'-bis-(2,6-di-tert.-butylphenol); 1,3,5-trimethyl-2,4,6-tris-(3,5-di-tert.-butyl-4-hydroxy-benzyl)-benzene; 4,4'-butylidene-bis-(6-tert.-butyl-m-cresol); 3,5-di-tert.-butyl-4-hydroxybenzyl-phosphonic acid diethyl ester; N,N'-bis-($\beta$-naphthyl)-p-phenylenediamine; N,N'-bis-(1-methylheptyl)-p-phenylenediamine; phenyl-$\beta$-naphthylamine; N,N'-bis-(1-methylheptyl)-p-phenylenediamine, phenyl-$\beta$-naphthylamine, 4,4'-bis-(α,α-dimethylbenzyl)-diphenylamine, 1,3,4-tris-(3,5-di-tert.-butyl-4-hydroxy-hydrocinnamoyl)-hexahydro-s-triazine, hydroquinone, p-benzoquinone, toluhydroquinone, p-tert.-butyl-pyrocatechol, chloranil, naphthoquinone, copper naphthenate, copper octoate, Cu(I)Cl/triphenyl phosphate, Cu(I)Cl/trimethyl phosphite, Cu(I)Cl/trischloroethyl phosphite, Cu(I)Cl/tripropyl phosphite and p-nitrosodimethylaniline. Also suitable as stabilizers against molecular weight degradation from hydrolysis are carbodiimides.

The polyester compositions according to the invention can be reinforced with reinforcing materials. Metals, silicates, carbon and glass, mainly in the form of fibers, fabrics or mats, have proved useful as reinforcing materials. Glass fibers are a preferred reinforcing material.

In addition, if desired, inorganic or organic pigments, dyestuffs, lubricants and mold release agents, such as zinc stearate, montan waxes, UV absorbers and the like, can be added in customary amounts.

In order to obtain flame-resistnt products, about 2–20% by weight, relative to the molding composition, of flameproofing agents which are in themselves known, for example, halogen-containing compounds, elementary phosphorus or phosphorus compounds, phosphorus/nitrogen compounds, antimony trioxide or mixtures of these substances, preferably antimony trioxide, decabromobiphenyl ether and tetrabromobisphenol A polycarbonate, can be added.

The rate of crystallization of the polyester compositions according to the invention can be further increased by adding about 0.01–1% by weight, relative to the unfilled and unreinforced polyester of nucleating agents. Suitable nucleating agents are the compounds known to those skilled in the art, such as those described, for example, in Kunststoff-Handbuch (Plastics Handbook), Volume VIII, "Polyester" ("Polyesters"), Carl Hanser Verlag, Munich, 1973, page 701.

The polyester compositions according to the invention are excellent starting materials for the production of films and fibers and preferably for the production of moldings of all types by injection molding.

EXAMPLES

In order to determine the processing cycle time which can be achieved, the injection mold for a gearwheel ($\phi$40 mm, thickness 7 mm) was used in which the injection molding was pressed out of the mold by four ejector pins. The injection cycle with which the ejector pins just no longer penetrated into the finished injection molding and the injection molding fell out of the mold without difficulty was determined.

Table 1 gives the cooling times in the mold (i.e. the time interval between end of injection and removal of the extruder from the mold and the opening of the mold) and the total injection cycle times for several polyester resin compositions according to the invention based on nucleated polyethylene terephthalate homopolymer (PET) with an i.v. of 0.94 in 1:1 phenol/tetrachloroethane at 25° C. and oligomeric polyesters (Examples 1-11) compared with the unalloyed PET, and the PET blended with non-polyester oligomers (Examples 12-17).

Table 2 gives similar results for a polyester resin composition based upon a microtalc nucleated copolyethylene terephthalate (0.6 mol % of 2-ethylhexanediol-(1,3) based on the diol component) with an i.v. of 0.76 and a phthalic acid based oligomer.

Table 3 gives similar results for the polyethyelene terephthalate homopolymer of Table 1 filled with 30 wt. %, based on the weight of the total composition, of glass fibers.

TABLE 1

Polyethylene Terephthalate, i.v. 0.94

| Example | Oligomeric Polyester | Amount (% by wt) | Cylinder Temperature (°C.) | Mold Temperature | Cooling Time (Sec) | Total Injection Molding Cycle (Sec) |
|---|---|---|---|---|---|---|
| 1 | Polyhexanediol 1,6 adipate Mn = 2000 | 5 | 260 | 110 | 10 | 19.5 |
| 2 | Polybutanediol 1,4 adipate Mn = 1940 | 5 | 260 | 110 | 13 | 22.5 |
| 3 | Polybutanediol 1,3 adipate Mn = 1315 | 5 | 260 | 110 | 16 | 25.5 |
| 4 | Polytriethylene glycol adipate with isononyl end groups Mn = 660 | 10 | 260 | 110 | 4 | 13.5 |
| 5 | Polytriethylene glycol adipate with isononyl end groups Mn = 900 | 10 | 260 | 110 | 3 | 12.5 |
| 6 | Polytriethylene glycol phthalate with isononyl end groups Mn = 2000 | 5 | 260 | 110 | 7 | 16.5 |
| 7 | Polyhexanediol 1,6 adipate Mn = 1500 | 10 | 260 | 110 | 6 | 15.5 |
| 8 | Polyhexanediol 1,6 adipate Mn = 1200 | 10 | 260 | 110 | 2 | 11.5 |
| 9 | Polyhexanediol 1,6 adipate Mn = 900 | 10 | 260 | 110 | 1 | 10.5 |
| 10 | Polyhexanediol 1,6 adipate Mn = 600 | 10 | 260 | 110 | 0 | 9.5 |
| 11 | Polyhexane diol 1,6 phthalate with isodecyl end groups Mn = 1300 | 5 | 260 | 110 | 18 | 27.5 |
| Comparison | | | | | | |
| 12 | None | | 270 | 140 | 30 | 39.5 |
| 13 | Polyurethane | 5 | 260 | 110 | >30 | >39.5 |
| 14 | Polybutadiene acrylonitrile | 5 | 260 | 110 | >>30 | >>39.5 |
| 15 | ABS | 5 | 260 | 110 | >60 | >69.5 |
| 16 | Polybutadiene acrylonitrile | 5 | 260 | 110 | >30 | >37.5 |
| 17 | Polyethylene | 5 | 260 | 110 | >30 | >39.5 |

TABLE 2

Copolyethylene Terephthalate with 0.6 mol % Based on Diol Residues of 2 Ethylhexane Diol Residue

| Example | Phthalic acid ester Name | Quantity (% by wt) | Temperature Of Cylinder (°C.) | Temperature Of Mold (C.°) | Cooling Time (°C.) | Total Injection Molding Cycle (sec) |
| --- | --- | --- | --- | --- | --- | --- |
| 18 | Di-isononyl poly-triethylene glycol phthalate Mn = 2000 | 5 | 260 | 108 | 3.0 | 12.5 |
| Comparison 19 | — | — | 270 | 130 | 10.0 | 19.5 |

TABLE 3

Polyethylene Terephthalate, i.v. 0.94, Filled with 30 Wt. % of Glass Fibers

| Example | Oligomeric Polyester | Amount (wt. %) | Cylinder Temperature (°C.) | Mold Temperature (°C.) | Cooling Time (sec) | Total Injection Molding Cycle (seconds) |
| --- | --- | --- | --- | --- | --- | --- |
| 20 | Polybutanediol 1,4 adipate Mn = 1940 | 10 | 260 | 110 | 1 | 10.5 |
| 21 | Polybutanediol 1,3 adipate Mn = 1315 | 10 | 260 | 110 | 1 | 10.5 |
| 22 | Polyhexane diol 1,6 adipate isodecyl end groups Mn = 2000 | 10 | 260 | 110 | 3 | 12.5 |
| 23 | Polyhexane diol 1,6 adipate Mn = 2000 | 10 | 260 | 110 | 0 | 9.5 |

Although the invention has been described in detail in the foregoing for the purpose of illustration, it is to be understood that such detail is solely for that purpose, and that variations can be made therein by those skilled in the art without departing from the spirit and scope of the invention except as it may be limited by the claims.

What is claimed is:

1. A thermoplastic composition which crystallizes rapidly, comprising
   (a) a high molecular weight polyalkylene terephthalate which has an intrinsic viscosity of at least about 0.4 dl/g (measured as a 0.5% strength by weight solution in a phenol/tetrachloroethane mixture in a weight ratio of 1:1 at 25° C.) and
   (b) about 0.5 to 30% by weight based on the weight of (a) and (b) of an oligomeric polyester having a minimum polymerization degree of 2 and a maximum number-average molecular weight of about 6000, said oligomer being free of any substituents which are substantially reactive with said high molecular weight polyalkylene terephthalate under injection molding conditions.

2. The composition of claim 1 containing at least about 4 wt. % of oligomer based on the weight of high molecular weight polymer and oligomer.

3. The composition of claim 1 in which the polyalkylene terephthalate has an intrinsic viscosity of at least about 0.8 dl/g.

4. The composition of claim 1 wherein the oligomer is based on sebacic acid, adipic acid or both.

5. A process for the production of a composition as claimed in claim 1, in which about 70 to 99.5% by weight of a high molecular weight polyalkylene terephthalate with an intrinsic viscosity of at least about 0.4 dl/g and about 0.5 to 30% by weight of an oligomeric polyester having a minimum polymerization degree of 2 and a maximum number average molecular weight of about 6000, said oligomer being free of substituents which are substantially reactive with said high molecular weight polyalkylene terephthalate are mixed together and homogenized in the melt.

6. A process according to claim 5 in which about 85 to 99.5% by weight of the polyalkylene terephthalate and about 0.5 to 15% by weight of the oligomer are mixed together and homogenized in the melt.

7. A process according to claim 5, in which the polyalkylene terephthalate has been produced by esterifying or transesterifying an acid component which is at least about 90 mol % of terephthalic acid and a dialkylterephthalate with 1.05 to 5.0 mols of a diol component, relative to 1 mol of the dicarboxylic acid component, in the presence of an esterication catalyst and/or transesterification catalyst and subjecting the product thus obtained to a polycondensation reaction in the presence of a polycondensation catalyst at between about 200° and 300° C. under reduced pressure.

8. A process according to claim 7, in which at least about 90 mol % of the diol component is selected from the group consisting of 1,3-propane diol; 1,4-butane diol; 1,5-pentane diol; 1,6-hexane diol; cyclohexane-1,4-dimethanol and ethylene glycol.

9. A process according to claim 5 in which the oligomer has been produced by esterifying adipic acid or sebacic acid with a diol selected from 2-ethylhexane-1,3-diol, 2,2,4-trimethylpentane-1,3-diol, butane-1,3-diol, hexane-1,6-diol and butane-1,4-diol and a monohydric alcohol selected from 2-ethylhexanol, 3,5,5-trimethylhexanol and n-butanol.

10. The product of the process of claim 9.

11. A process for increasing the rate of crystallization of a high molecular weight polyethylene terephthalate comprising incorporating therein sufficient oligomeric polyester having a minimum polymerization degree of 2 and a maximum number average molecular weight of about 6000, said oligomer being free of any substituents which are substantially reactive with said high molecular weight polyethylene terephthalate under injection molding conditions to ensure that the polyester when injection molded into molds held at less than about 120° C. will have at least about 70% of the crystallinity obtainable by injection molding the polyester alone into molds held at temperatures in excess of 140° C. with mold residence times in excess of sixty seconds.

12. A highly crystalline thermoplastic composition which crystallizes rapidly comprising a blend of
(a) a polyalkylene terephthalate based on an acid component of at least about 90 mol % terephthalic acid and a diol component of at least about 90 mol % ethylene glycol, said polymer having an intrinsic viscosity of at least about 0.8 dl/g as measured at 25° in a 1:1 phenol tetrachloroethane mixture, and
(b) about 0.5 to 15 weight % based on the weight of (a) and (b) of an oligomer of sebacic or adipic acid with a diol selected from 2-ethylhexane-1,3-diol; 2,2,4-trimethylpentane-1,3-diol; and butane-1,3-diol, hexane-1,6-diol and butane-1,4-diol; and with a monohydric alcohol selected from 2-ethylhexanol, 3,5,5-trimethyl hexanol and n-butanol; said oligomer having a polymerization degree of at least 2 and having a number-average molecular weight of no more than about 6000, and being free of substituents which are substantially reactive with said polyalkylene terephthalate under injection molding conditions.

13. A process for injection molding a thermoplastic polyester comprising
(1) intimately blending
(a) a polyester at least about 90 mol % of whose acid residues are derived from terephthalic acid and at least 90 mol % of whose alcohol residues are derived from ethylene glycol, said polyester having an intrinsic viscosity of at least about 0.4 dl/g in 1:1 phenol/tetrachloroethane at 25° C., with
(b) an oligomeric polyester having a minimum polymerization degree of 2 and a maximum number-average molecular weight of about 6000, said oligomer being free of substituents substantially reactive with said polyester under injection molding conditions and
(2) injection molding, said blend into molds held at temperatures less than about 120° C., a sufficient amount of said oligomer product being included in the blend to ensure a significant degree of crystallinity to the molded polyester.

14. The process of claim 13 wherein sufficient oligomer is used to ensure that the molded polyester has no less than about 70% of the crystallinity obtainable by injection molding the polyester alone into molds held at least about 140° C. with residence times of in excess of about 60 seconds.

15. The process of claim 14 wherein the polyester consists essentially of terephthalic acid residues and ethylene glycol residues.

16. The process of claim 13 wherein sufficient oligomer is used to ensure that the molded polyester has at heat of crystallization of no less than about 6 cal/g.

17. The composition of claim 1 in which the oligomeric polyester (b) consists essentially of structural units of the formula (I)

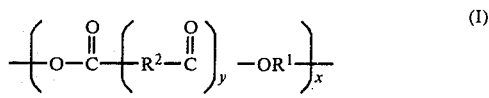

or of a mixture of said structural units with structural units of the formula (II)

wherein
$R^1$ denotes a linear or branched aliphatic, cycloaliphatic or araliphatic divalent radical with 2-20 C-atoms,
$R^2$ denotes a linear or branched aliphatic, cycloaliphatic, araliphatic or aromatic divalent radical of 2 to 20 C-atoms,
x denotes an integer of at least 2, up to any value giving the oligomer a number-average molecular weight of 6000 or less, and
y is an integer of 0 or 1.

18. The composition of claim 17 wherein the oligomeric polyester consists essentially of structural units of the formula I

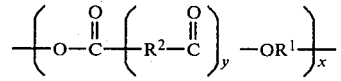

wherein $R^1$, $R^2$, x and y are as defined in claim 17.

19. An improved process for forming injection molded articles comprising
(1) intimately blending
(a) a polyester at least about 90 mol % of whose acid residues are derived from terephthalic acid and at least 90 mol % of whose alcohol residues are derived from ethylene glycol, said polyester having an intrinsic viscosity of at least about 0.4 dl/g in 1:1 phenol/tetrachloroethane at 25° C., with
(b) an oligomeric polyester having a minimum polymerization degree of 2 and a maximum number-average molecular weight of about 6,000, said oligomer being free of any substituents which are substantially reactive with said high molecular weight polyalkylene terephthalate, under injection molding conditions and
(2) injection molding said blend with mold temperatures less than about 120° C. and with mold residence times significantly less than those required when molding the same part from the polyester alone, the amount of oligomeric polyester and the residence time being sufficient to ensure at least about 70% of the crystallinity obtainable by molding the polyester alone with mold temperatures no less than about 140° C. and residence times in excess of 60 seconds.

* * * * *